(12) United States Patent
Maeda et al.

(10) Patent No.: US 7,150,341 B2
(45) Date of Patent: Dec. 19, 2006

(54) TRANSMISSION APPARATUS OF ALL-TERRAIN VEHICLE

(75) Inventors: Kazuhiro Maeda, Akashi (JP); Koji Watanabe, Kanazawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 307 days.

(21) Appl. No.: 10/704,971

(22) Filed: Nov. 12, 2003

(65) Prior Publication Data

US 2004/0140146 A1 Jul. 22, 2004

(30) Foreign Application Priority Data

Nov. 13, 2002 (JP) .............................. 2002-329560

(51) Int. Cl.
*B60W 10/10* (2006.01)
*B60W 10/18* (2006.01)

(52) U.S. Cl. ................ 180/336; 74/481; 74/485; 74/489; 192/220; 192/220.2

(58) Field of Classification Search ............. 180/336, 180/333; 74/484 R, 481, 485, 488, 489; 192/220, 220.2, 220.3
See application file for complete search history.

(56) References Cited

U.S. PATENT DOCUMENTS

| | | | | |
|---|---|---|---|---|
| 3,856,123 A | * | 12/1974 | Kinsey ...................... 192/3.62 |
| 4,624,350 A | * | 11/1986 | Akashi ........................ 192/220 |
| 4,917,224 A | * | 4/1990 | Gokee ...................... 192/220.2 |
| 4,986,399 A | * | 1/1991 | Gokee ...................... 192/220.3 |
| 5,031,737 A | * | 7/1991 | Dzioba et al. ............ 192/220.2 |
| 5,365,803 A | * | 11/1994 | Kelley et al. .............. 74/484 R |
| 5,383,541 A | * | 1/1995 | Kaplan ........................ 192/220 |
| 5,410,923 A | * | 5/1995 | Yamashita et al. ....... 74/473.26 |
| 6,182,784 B1 | * | 2/2001 | Pestotnik .................... 180/376 |
| 6,186,263 B1 | * | 2/2001 | Takano ....................... 180/336 |
| 6,257,081 B1 | * | 7/2001 | Gagnon et al. ............... 74/335 |
| 6,332,524 B1 | * | 12/2001 | Shin ....................... 192/220.2 |
| 6,360,624 B1 | * | 3/2002 | Sedlmaier et al. ........... 74/335 |
| 6,457,381 B1 | * | 10/2002 | Nonaka et al. ............... 74/661 |
| 6,532,842 B1 | * | 3/2003 | Arai et al. ................ 74/473.31 |
| 6,626,260 B1 | * | 9/2003 | Gagnon et al. ............. 180/291 |
| 6,848,559 B1 | * | 2/2005 | Kim ....................... 192/220.2 |
| 6,913,104 B1 | * | 7/2005 | Kaesgen et al. ............ 180/336 |
| 2004/0107790 A1 | * | 6/2004 | Maeda et al. ............. 74/484 R |

FOREIGN PATENT DOCUMENTS

JP    A 8-337131    12/1996
JP    B2 3040971    3/2000

* cited by examiner

*Primary Examiner*—Paul N. Dickson
*Assistant Examiner*—George D. Spisich
(74) *Attorney, Agent, or Firm*—Oliff & Berridge, PLC

(57) ABSTRACT

A transmission apparatus of an all-terrain vehicle includes: a non-stage transmission disposed in a power transmission path from an engine to drive wheels; a forward and backward movement switching device capable of switching to a forward movement position, a neutral position, or a backward movement position, the forward and backward movement switching device being disposed in the power transmission path at a position near said engine; and a shift operation device for switching forward and backward movement disposed on a handle bar at a position adjacent to a handle grip, the shift operation device and the forward and backward movement switching device being interlocked with each other.

14 Claims, 9 Drawing Sheets

TRANSMISSION APPARATUS OF ALL-TERRAIN VEHICLE

BACKGROUND OF THE INVENTION

1. Field of the Invention

The present invention relates to a transmission apparatus of an all-terrain vehicle having, in a power transmission path from an engine to drive wheels, a non-stage transmission, such as V belt non-stage transmission, and a forward and backward movement switching device capable of switching to a forward movement position, neutral position, or backward movement position.

2. Description of the Related Art

In this kind of all-terrain vehicle, a forward and backward movement switching device installed on the vehicle together with a non-stage transmission such as a V belt non-stage transmission is shifted to the forward movement position during regular running. The speed is automatically changed by the V belt non-stage transmission during running. If necessary, the vehicle is stopped once, the forward and backward movement switching device is shifted to the backward movement position, and the vehicle is restarted running.

As a shift operation device for operating the forward and backward movement switching device, conventionally, a lever type shift operation device is arranged in the neighborhood of a fuel tank which is positioned in front of a seat of the vehicle. The forward and backward movement switching device is shifted to the forward movement position or backward movement position by operating a shift lever of the lever type shift operation device, as described in Japanese patent laid-open publication No. 8-337131 and Japanese patent publication No. 3040971, etc.

In the forward and backward movement switching device described in the above-mentioned publications, the shift lever is arranged, for example, in a gate plate having an H-type or I-type guide slit and switches to the neutral position, forward movement position, or backward movement position by moving the shift lever along the guide slit.

In the vehicle that the shift operation device for switching forward and backward movement positions is arranged near the fuel tank which is far away from a grip of a handle, the rider must release his hand from the grip in order to grasp the shift lever and perform the shift operation viewing the gate plate. Therefore, the rider cannot operate the shift lever in the same riding posture as that during running so that the shift operation is made troublesome. Further, in the case that the shift lever is arranged near the fuel tank, the space around the legs of the rider is limited.

SUMMARY OF THE INVENTION

The present invention has been made to improve a shift operability of a forward and backward movement switching device of an all-terrain vehicle. More specifically, the objectives of the present invention are to provide a transmission apparatus of an all-terrain vehicle capable of enabling a rider to comfortably perform a shift operation while maintaining to grasp the grips by both hands and to easily discriminate the conditions of the shift operation.

According to the first aspect of the present invention, a transmission apparatus of the all-terrain vehicle comprises: a non-stage transmission disposed in a power transmission path from an engine to drive wheels; a forward and backward movement switching device capable of switching to a forward movement position, a neutral position, or a backward movement position, the forward and backward movement switching device being disposed in the power transmission path at a position near the engine; and a shift operation device for switching forward and backward movement disposed on a handle bar at a position adjacent to a handle grip, the shift operation device and the forward and backward movement switching device being interlocked with each other.

By use of such a constitution, the rider can perform the shift operation for switching forward and backward movement almost in the same riding posture as that during running without releasing a hand from the grip, thus the shift operability for switching forward and backward movement is improved. Further, since the shift operation device is disposed on the handle bar at a position adjacent to the handle grip, the space around the legs of the rider can be widely reserved.

Preferably, in the transmission apparatus of the all-terrain vehicle, the shift operation device is a rotary type and has a rotary member which is rotatable about an axis of the handle bar.

Preferably, the transmission apparatus of an all-terrain vehicle further comprises a stopper mechanism to prevent the forward and backward switching device from shifting from the neutral position to the backward movement position, the stopper mechanism being adapted to be released at a time of a brake operation of the vehicle.

According to the second aspect of the present invention, a transmission apparatus of the all-terrain vehicle comprises: a non-stage transmission disposed in a power transmission path from an engine to drive wheels; a forward and backward movement switching device capable of switching to a forward movement position, a neutral position, or a backward movement position, the forward and backward movement switching device being disposed in the power transmission path at a position near the engine; and a stopper mechanism to prevent a switching rotary part of the forward and backward switching device from moving from the neutral position to the backward movement position, the stopper mechanism being interlocked with a brake device, and the stopper mechanism being adapted to be released at a time of a brake operation.

By use of such a constitution, a brake operation is needed in order to perform a backward shift by the forward and backward movement switching device, and the shift operation to backward movement can be automatically recognized, and during the shift operation, the vehicle can be prevented from moving back and forth.

Preferably, the transmission apparatus of the all-terrain vehicle further comprises: a shift operation device for switching forward and backward movement disposed on a handle bar at a position adjacent to a handle grip, the shift operation device and the forward and backward movement switching device being interlocked with each other.

By use of such a constitution, the rider can perform the shift operation for switching forward and backward movement almost in the same riding posture as that during running without releasing a hand from the grip, thus the shift operability for switching forward and backward movement is improved, and moreover, since a brake operation is needed in order to perform a backward shift, the shift operation to backward movement can be automatically recognized and the vehicle can be prevented from moving back and forth during a shift operation.

Preferably, in the transmission apparatus of the all-terrain vehicle, the shift operation device is a rotary type and has a rotary member which is rotatable about an axis of the handle bar.

Preferably, in the transmission apparatus of the all-terrain vehicle, the stopper mechanism has a stopper member capable of entering and leaving a moving track between the neutral position and the backward movement position of the switching rotary part of the forward and backward movement switching device, the stopper member being configured to be kept in a state that the stopper member enters the moving track by elastic means to restrict a movement of the switching rotary part and leave the moving track by the brake operation.

By use of such a constitution, the structure of the stopper mechanism can be simplified, and when returning the switching device from the backward movement position to the neutral position, the brake operation is not required and the stopper mechanism is automatically returned to the operating state, thus the operability is improved.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

[Outline of All-Terrain Vehicle]

Figure 1:
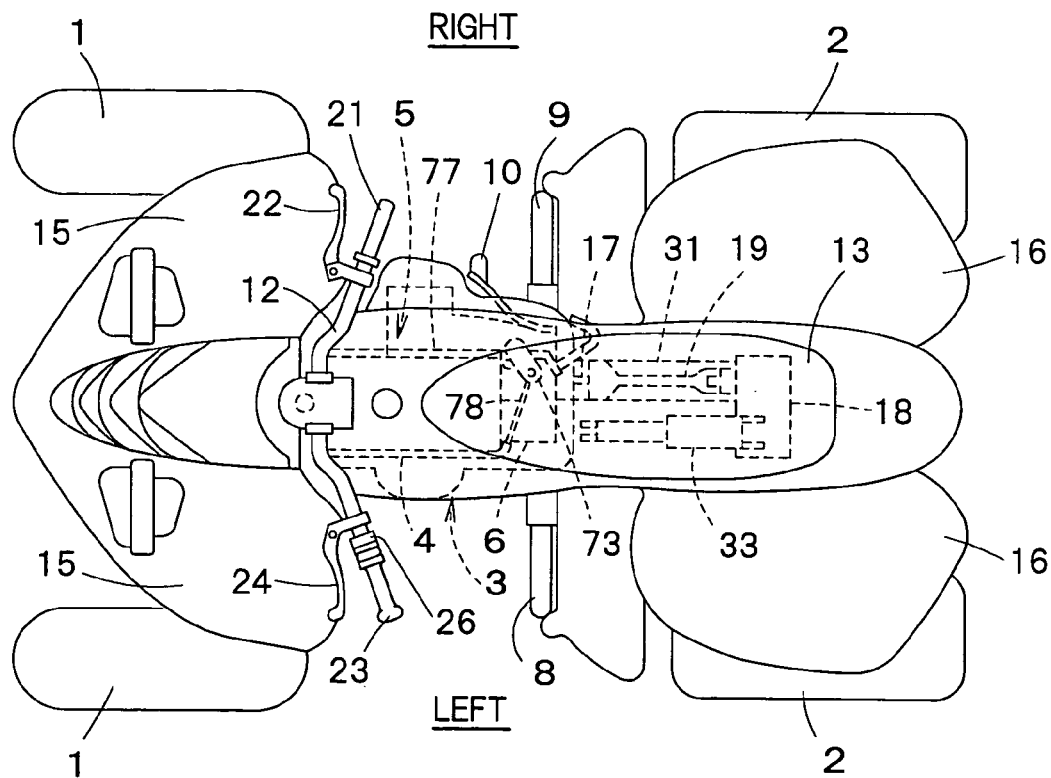
FIG. 1 is a plan view of an all-terrain vehicle to which the present invention is applied.

In FIG. 1, for simplicity of explanation, "Left" and "Right" shown in the drawing indicate that the left direction and right direction viewed from a rider are the left direction and right direction of an all-terrain vehicle.

The all-terrain vehicle has a pair of front wheels 1 and a pair of rear wheels 2 and an engine 3 disposed between the wheels 1 and 2. In the neighborhood of the rear of the engine 3, a pair of bar-shaped steps 8 and 9 are provided and in the neighborhood of the step 9 on the right side, a footbrake 10 is installed in a rotatative state.

On the front side of the upper part of a vehicle body, a handle bar 12 is arranged, and behind the handle bar 12, a seat 13 is arranged, and above the front wheels 1 and the rear wheels 2, a front fender 15 and a rear fender 16 are respectively arranged.

On the right side of a crankcase 4 of the engine 3, a V belt non-stage transmission 5 is provided and on the rear of the crankcase 4, a gear type forward and backward movement switching device 6 is stored. Between a power output shaft 17 protruded from the rear end of the forward and backward movement switching device 6 and a final speed reducer 18 for driving the rear wheels, a drive shaft 19 is installed via universal couplings.

At the right end of the handle bar 12, a right acceleration grip 21 is provided in a rotative state and a front wheel brake lever 22 is also provided, and at the left end of the handle bar 12, a left grip 23 is fixed and a rear wheel brake lever 24 is provided. Furthermore, on the handle bar 12 neighboring the left grip 23, a shift operation device 26 for switching forward and backward movement of the vehicle is provided, and the shift operation device 26 for switching forward and backward movement is interlocked with an outside shift lever 73 of the forward and backward movement switching device 6 by a pair of cable transfer devices 77 and 78 for transferring operational force.

Figure 2:
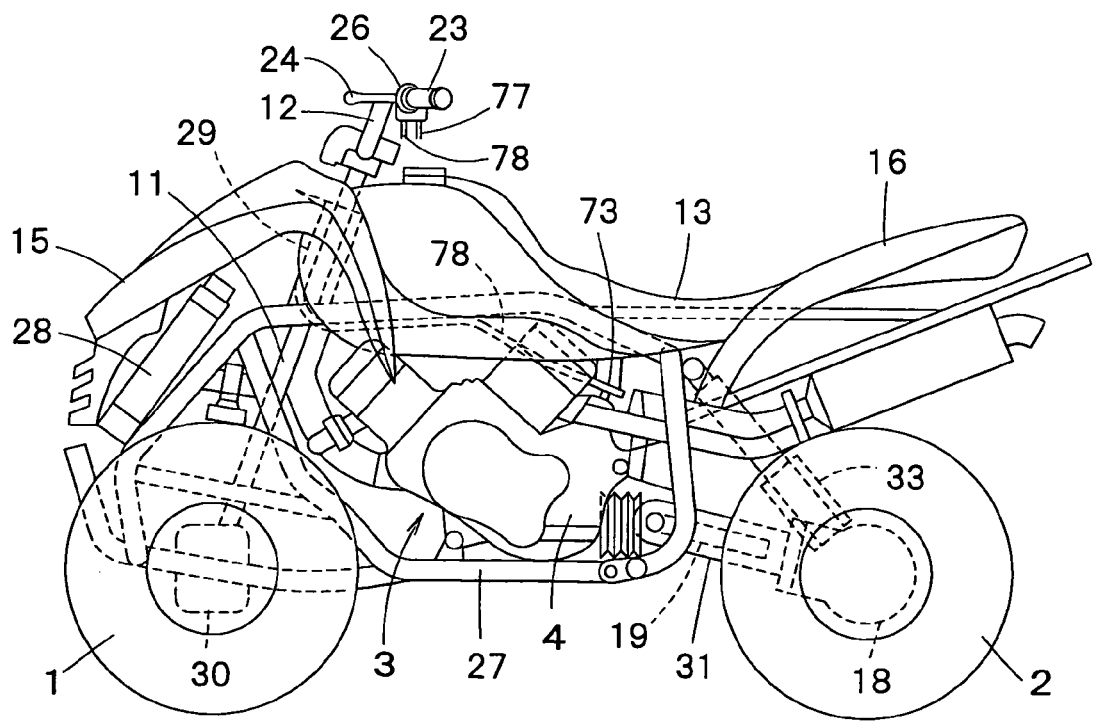
FIG. 2 is a left side view of the all-terrain vehicle shown in FIG. 1.

FIG. 2 is a left side view of the all-terrain vehicle, wherein a V-type 2-cylinder engine 3 is loaded, and the engine 3 is stored and supported in a body frame 27, and at the front end of the body frame 27, a radiator 28 is arranged.

The handle bar 12 is fixed to the upper end of a steering shaft 11, and the steering shaft 11 is supported by a shaft support case (head pipe) 29 installed on the front of the body frame 27 in a rotative state, and the lower end of the steering shaft 11 is interlocked with a front wheel steering device 30.

The final speed reducer 18 for driving the rear wheels is supported by the body frame 27 so as to freely swing in the vertical direction via a swing arm 31 storing the drive shaft 19 and elastically supported by a rear suspension 33.

[V Belt Non-Stage Transmission]

Figure 3:
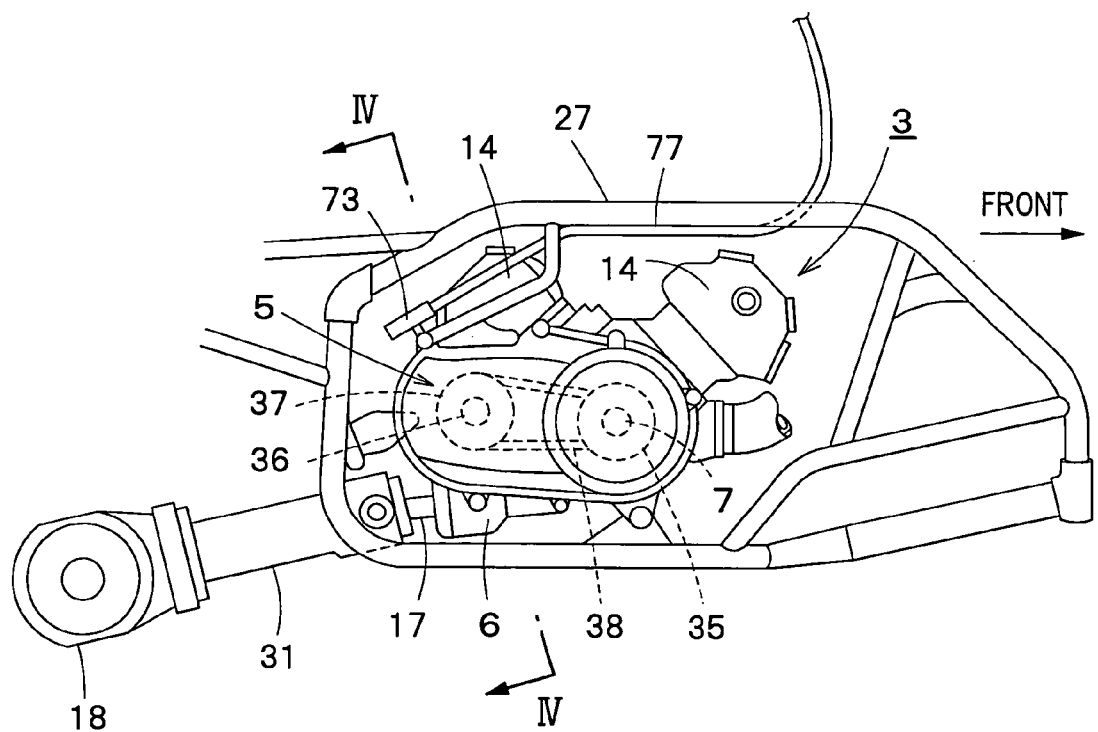
FIG. 3 is a right side view of the body frame and an engine of the all-terrain vehicle shown in FIG. 1.

FIG. 3 is a right side view of the body frame 27 and the engine 3, wherein the V belt non-stage transmission 5 is composed of a drive pulley 35 mounted on the crank shaft 7, a driven pulley 37 mounted on a driven shaft 36, and a V belt 38 wound between the pulleys 35 and 37 and in the same way as the well-known V belt non-stage transmission, due to changes in the number of rotations of the engine and the load from the rear wheel side, the effective pulley diameters of the respective pulleys 35 and 37 is automatically adjusted, thus automatic non-stage speed variation is realized.

[Forward and Backward Movement Switching Device]

Figure 4:
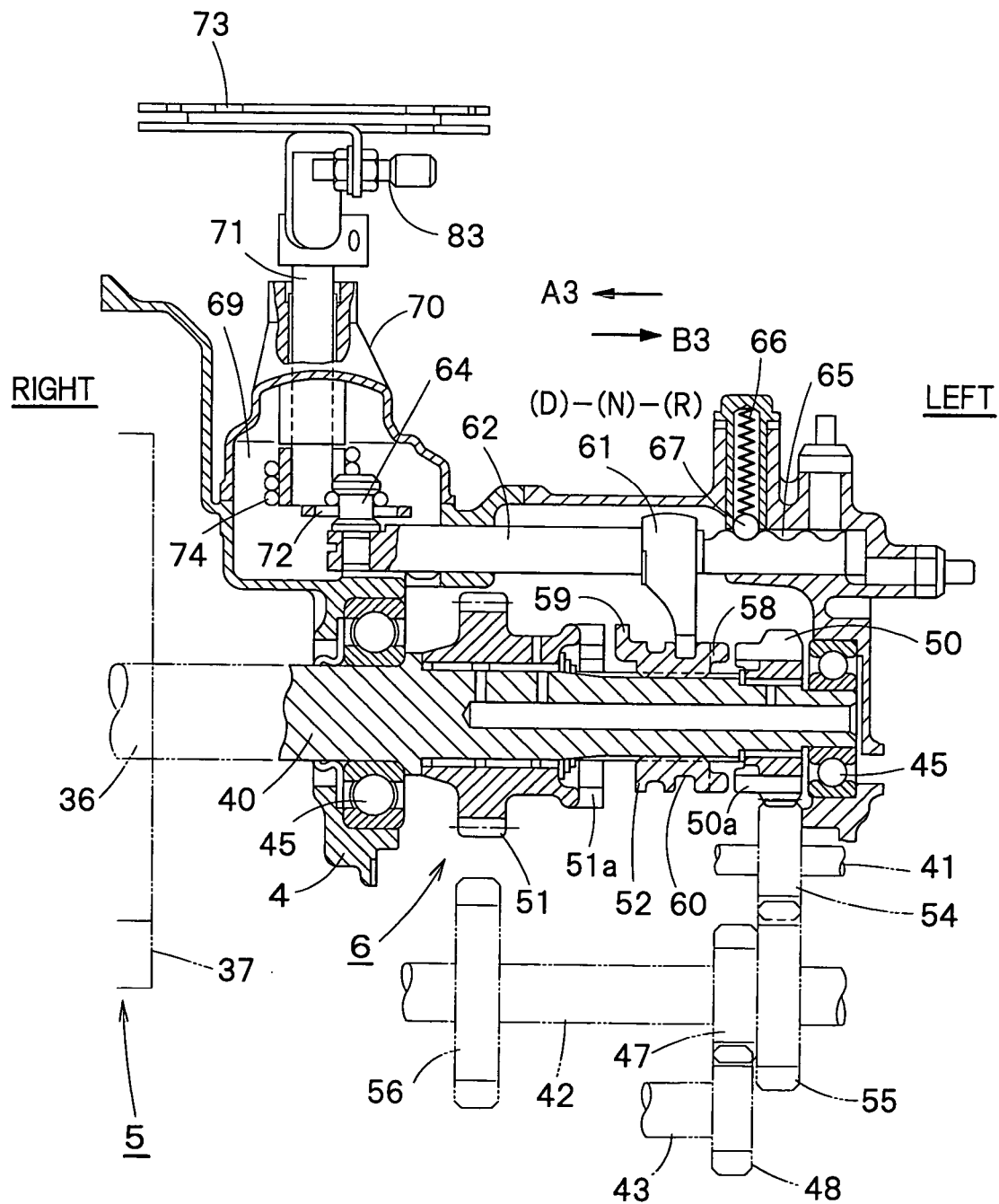
FIG. 4 is an enlarged view of the section IV—IV shown in FIG. 3.

FIG. 4 is an enlarged view of the section IV—IV shown in FIG. 3. Properly, it shows a state that the forward and backward movement switching device 6 is cut and developed by a plane passing an input shaft 40, a backward movement idle shaft 41, an intermediate output shaft 42, and an output shaft 43 and in the drawing, the transverse direction (indicated in the drawing) of the vehicle and the transverse direction of the drawing are opposite to each other. The gear type forward and backward movement switching device 6, as mentioned above, has the input shaft 40, the backward movement idle shaft 41, the intermediate output shaft 42, and the output shaft 43 and the input shaft 40 is formed integrally with the driven shaft 36 of the V belt non-stage transmission 5 and supported by the left and right side walls of the crankcase 4 via a bearing 45. At the left end of the input shaft 40, a backward movement input gear 50 is arranged, and at the right end, a forward movement input gear 51 is arranged, and between the input gears 50 and 51, a shift sleeve 52 is spline-fit in an axially movable state.

The backward movement input gear 50 has a dog pawl 50*a* on the end face (right end face) on the side of the shift sleeve 52, is fit into the input shaft 40 in a rotative state via the needle bearing, and mates with a backward movement output gear 55 of the intermediate output shaft 42 via an idle gear 54 of the backward movement idle shaft 41. The forward movement input gear 51 has a dog pawl 51*a* on the end face (left end face) on the side of the shift sleeve, is fit into the input shaft 40 in a rotative state via the needle bearing, and mates with a forward movement output gear 56 of the intermediate output shaft 42. The intermediate output shaft 42 is interlocked with the output shaft 40 via a transmission gear 47 and an output gear 48. The output gear 43 is interlocked with the power output shaft 17 (FIGS. 1 and 3) via the bevel gear mechanism not shown in the drawing. Further, FIG. 4 is a sectional development elevation of the forward and backward movement device 6 which is cut by a plane passing the shafts 40, 41, 42, and 43, so that the distance between the intermediate output shaft 42 and the input shaft 40 displayed on the drawing is longer than the actual distance. Therefore, the forward movement input gear 51 and the forward movement output gear 56 displayed on the drawing are away from each other. However, actually, they mate with each other as mentioned above.

On both end faces of the shift sleeve 52 in the axial direction, a backward movement dog pawl 58 opposite to the dog pawl 50*a* of the backward movement input gear 50 in a matable state and a forward movement dog pawl 59 opposite to the dog pawl 51*a* of the forward movement input gear 51 in a matable state are formed, and in the middle of the shift sleeve 52 in the direction of the axis, an outer peripheral ring slit 60 is formed, and a shift fork 61 is engaged with the ring slit 60. The shift fork 61 is fixed to a shift rod 62 supported by the crankcase 4 in a transversely movable state and can move in the transverse direction integrally with the shift rod 62.

The shift fork 61 and the shift sleeve 52 shown in FIG. 4 are in the state of the neutral position and the dog pawls 58 and 59 of the shift sleeve 52 are provided respectively at predetermined intervals in the direction of the axis from the dog pawls 50*a* and 51*a* of the input gears 50 and 51. When the shift sleeve 52 is moved from the neutral position toward the backward movement input gear 50 (in the direction of the arrow B3), the backward movement dog pawl 58 mates with the dog pawl 50*a* of the backward movement input gear 50 and enters the backward movement state. On the other hand, when the shift sleeve 52 is moved from the neutral position toward the forward movement input gear 51 (in the direction of the arrow A3), the forward movement dog pawl 59 mates with the dog pawl 51*a* of the forward movement input gear 51 and enters the forward movement state.

At the left end of the shift rod 62, a plurality of notches 65 for positioning the shift rod 62 at the forward movement position, neutral position, or backward movement position at predetermined intervals in the axial direction are formed and, a positioning ball 67 pressed by a spring 66 is joined to the notches 65. The right end of the shift rod 62 is projected into a shift lever chamber 69 formed at the right rear end of the crankcase 4, and a shift pin 64 having a projected top is provided on the projected part thereof.

In an upper wall case 70 of the shift lever chamber 69, a shift lever shaft 71 is supported in a rotative state and at the lower end of the shift lever shaft 71, an inner shift lever 72 extending forward and joining to the shift pin 64 is fixed.

The upper end of the shift lever shaft 71 is projected upward from the shift lever chamber 69 and an outer shift lever 73 is fixed to it.

Figure 6:
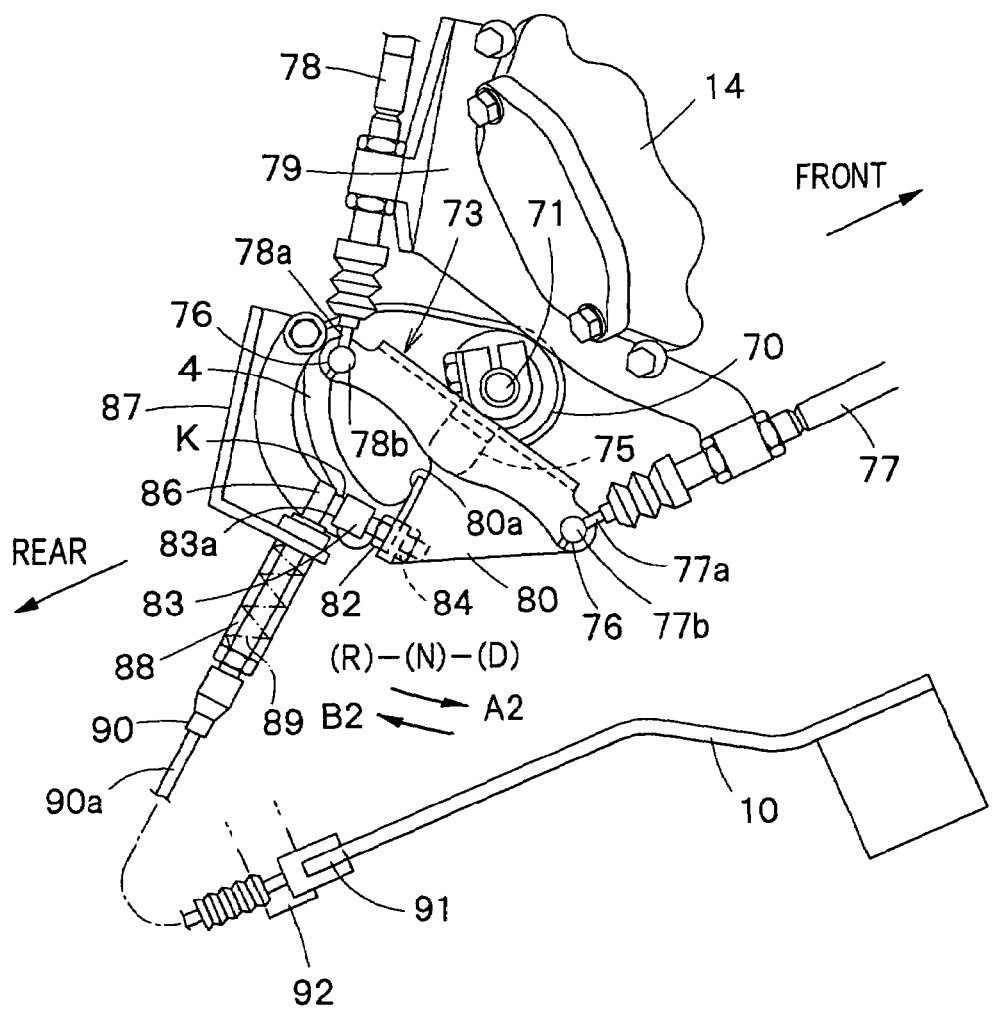
FIG. 6 is a plan view of FIG. 5.

FIG. 6 is a plan view in which the outer shift lever 73 having a U-shaped section (vertically folded in two) is fixed to the shift lever shaft 71 via an L-shaped bracket 75, extended from the shift lever shaft 71 like two wings, and at the ends of both wings, wire joint holes 76 are formed, respectively. To the joint holes 76, inner wire end terminals 77*b* and 78*b* of the cable transfer devices 77 and 78 are respectively joined and the outer wire end terminals of the cable transfer devices 77 and 78 are supported by a rear cylinder head 14 of the engine 3 via a bracket 79.

[Stopper Mechanism]

In FIG. 6, on the outer shift lever 73, to prevent the outer shift lever 73 from rotation in the direction of the arrow B2 from the neutral position N to the backward movement position R, a stopper mechanism composed of an adjust bolt 83 and a stopper pin 86 is arranged and the stopper mechanism is interlocked with the footbrake 10 via a cable device 90 and can be released by the stepping operation on the footbrake 10.

A stopper piece 80 is integrally formed with the outer shift lever 73 so as to project almost perpendicularly (almost right backward) to the line connecting the joint holes 76. A nut 82 is welded to a downward-facing folded part 80*a* of the stopper piece 80. The stopper adjust bolt 83 is screwed into the nut 82 in a posture along the rotational direction of the outer shift lever 73. The adjust bolt 83 is fixed by a locking nut 84 in a desired projection amount.

In FIG. 6, the outer shift lever 73 is positioned in the neutral position N, and the stopper pin 86 is arranged on the side of the backward movement position R (in the direction of the arrow B2) at a predetermined interval K from an end face 83*a* of the adjust bolt 83 in the neutral position N.

The stopper pin 86 is arranged in the moving track of the adjust bolt 83 when the outer shift lever 73 rotates in the direction of the arrow B2 from the neutral position N to the backward movement position R so as to freely enter or leave the moving track of the adjust bolt 83. The stopper pin 86 is connected to an inner wire 90*a* of the cable device 90 for the stopper mechanism and supported in a pin case 88 in an axially movable state. The stopper pin 86 is projected into the moving track of the adjust bolt 83 by the spring 89 in the pin case 88 and leaves right backward from the moving track against the spring 89 in the pin case 88 by pulling the inner wire 90*a*. The pin case 88 is fixed to the crankcase 4 via a bracket 87.

Figure 5:
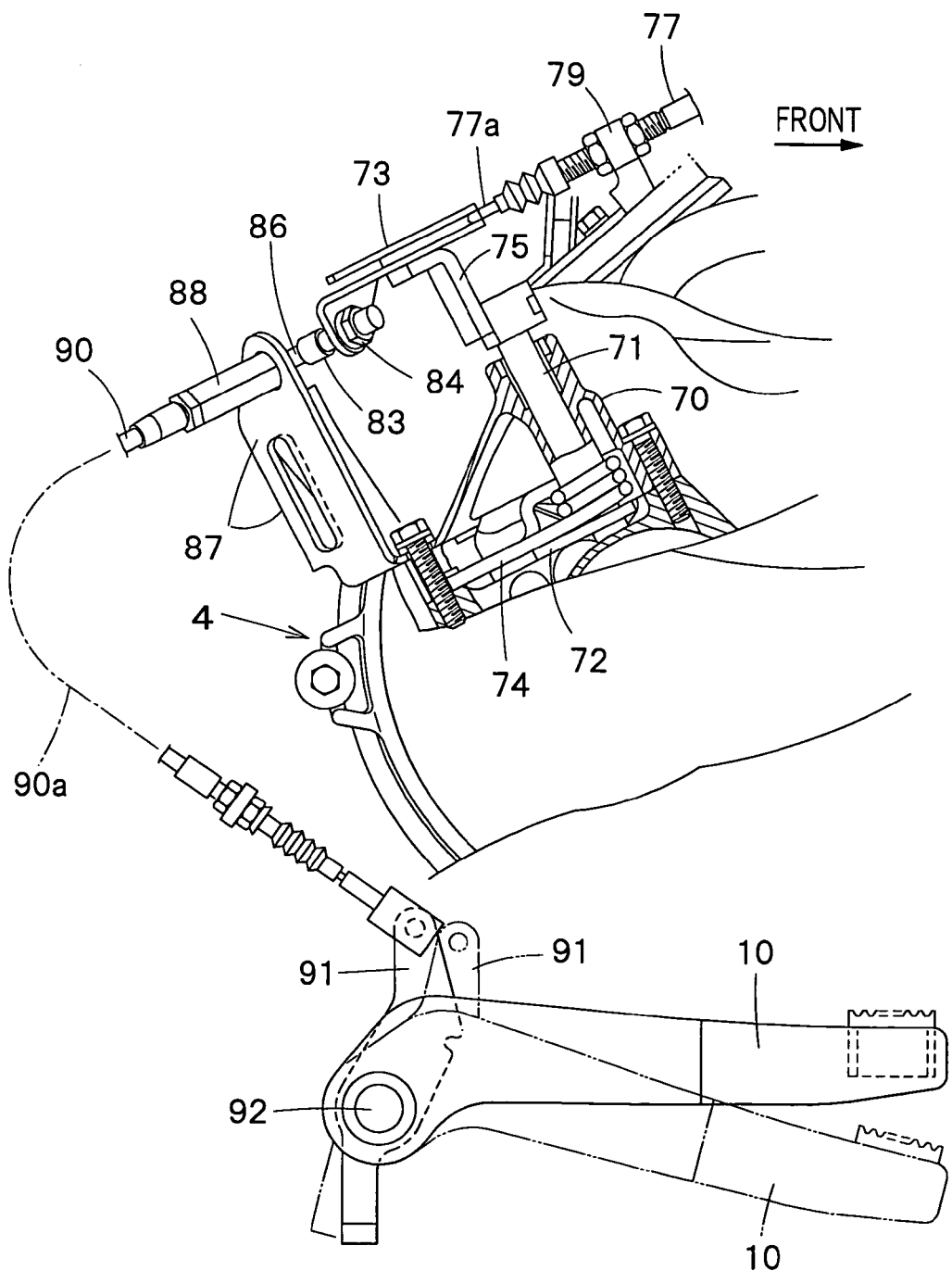
FIG. 5 is a right side view showing the rear end of the crankcase and footbrake.

FIG. 5 is a partial sectional right side view showing the relationship between the outer shift lever 73 and the footbrake 10. The cable device 90 for the stopper mechanism is extended in the neighborhood of a brake shaft 92 and flexibly attached to a joint projection 91 fixed to the brake shaft 92 or the footbrake 10. When the footbrake 10 is stepped on, the joint projection 91 rotating integrally with the footbrake 10 pulls the inner wire 90*a*, thereby the stopper pin 86 is pulled so as to leave from the moving track of the adjust bolt 83.

Figure 7:
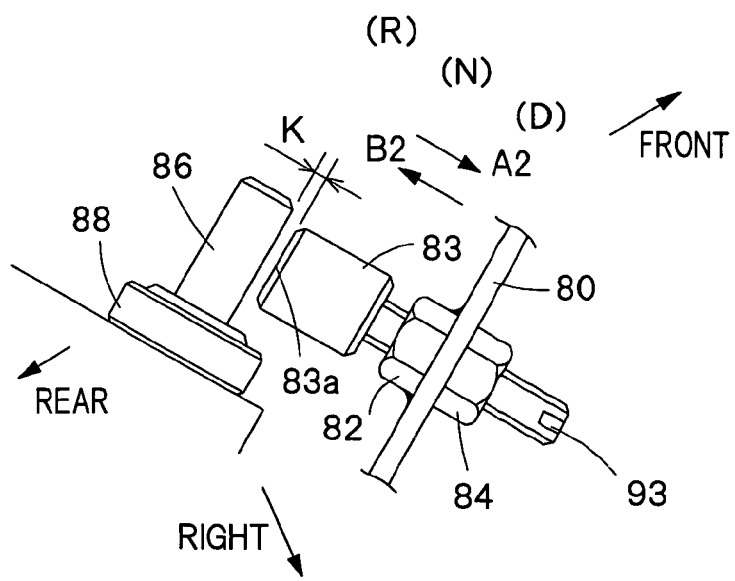
FIG. 7 is an enlarged plan view showing the adjust bolt of the stopper mechanism.

FIG. 7 is an enlarged plan view of the adjust bolt 83 of the stopper mechanism, and the end of the adjust bolt 83 is formed in a columnar shape with an enlarged diameter, and in the base end face (right end face) of the adjust bolt 83, a joint slit 93 to which a minus screwdriver can be joined is formed. When the screwdriver is joined into the joint slit 93 and the projection amount of the adjust bolt 83 is adjusted, the gap K between the stopper pin 86 in the neutral position and the end face 83a of the adjust bolt 83 can be adjusted. The gap K, even if the end face 83a of the adjust bolt 83 makes contact with the stopper pin 86, is adjusted so as to prevent the backward movement dog pawl 58 of the shift sleeve 52 in the neutral position N shown in FIG. 4 from making contact with the dog pawl 50a of the backward movement input gear 50.

[Shift Operation Device and Locking Mechanism]

Figure 8:
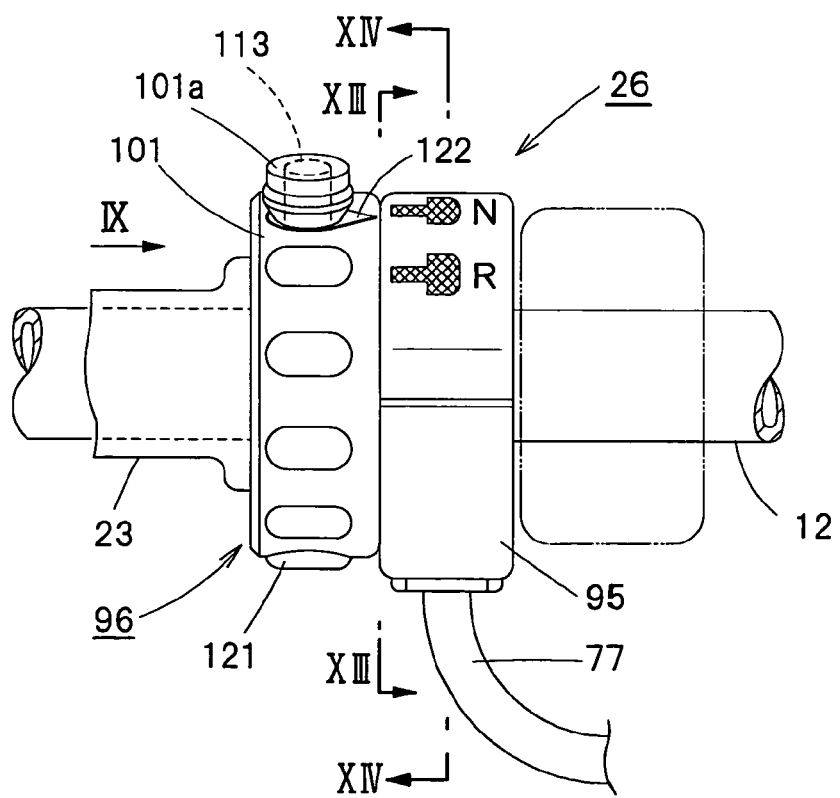
FIG. 8 is a front view of the shift operation device.

FIGS. 8 to 14 are detailed drawings of the shift operation device 26 for switching forward and backward movement. In FIG. 8 showing a front view, the shift operation device 26 for switching forward and backward movement, as mentioned above, is mounted on the handle bar 12 neighboring the left grip 23 so that a rider can perform the shift operation in a state that he grasps the left grip 23.

Figure 12:
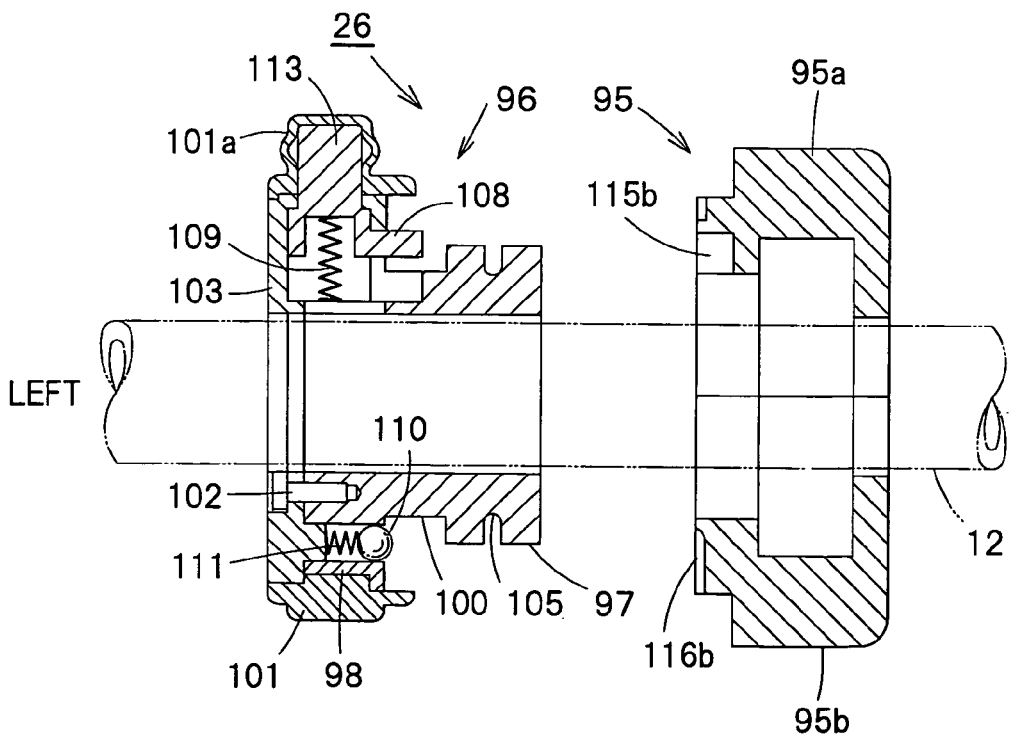
FIG. 12 is a sectional exploded view of XI—XI shown in FIG. 9.

FIG. 12 is a longitudinal sectional exploded view (an exploded view of the section XI—XI shown in FIG. 9) of the shift operation device 26, which is composed of a holder case 95 fixed to the handle bar 12 and a rotor assembly 96 supported by the holder case 95 in a rotative state around the axis of the handle bar 12.

The holder case 95 is structured so as to be vertically divided into two and upper and lower halved members 95a and 95b are joined to each other. The rotor assembly 96 is composed of a cylindrical body 100 integrally having a right reel 97 and a left dial part 98, a ring rubber cover 101 fit into the outer periphery of the dial part 98, and a ring cap 103 fixed to the left end face of the dial part 98 by a bolt 102.

A circular slit 105 for winding the inner wire is formed on the reel 97, and on the dial part 98, a locking mechanism composed of a locking pawl 108 and a coil spring 109 and a positioning mechanism composed of a positioning ball 110 and a coil spring 111 are provided. The locking pawl 108 is supported in the dial part 98 in a radially movable state, formed integrally with an unlocking knob 113, and pressed outward in the radial direction by the coil spring 109 integrally with the unlocking knob 113.

Figure 11:
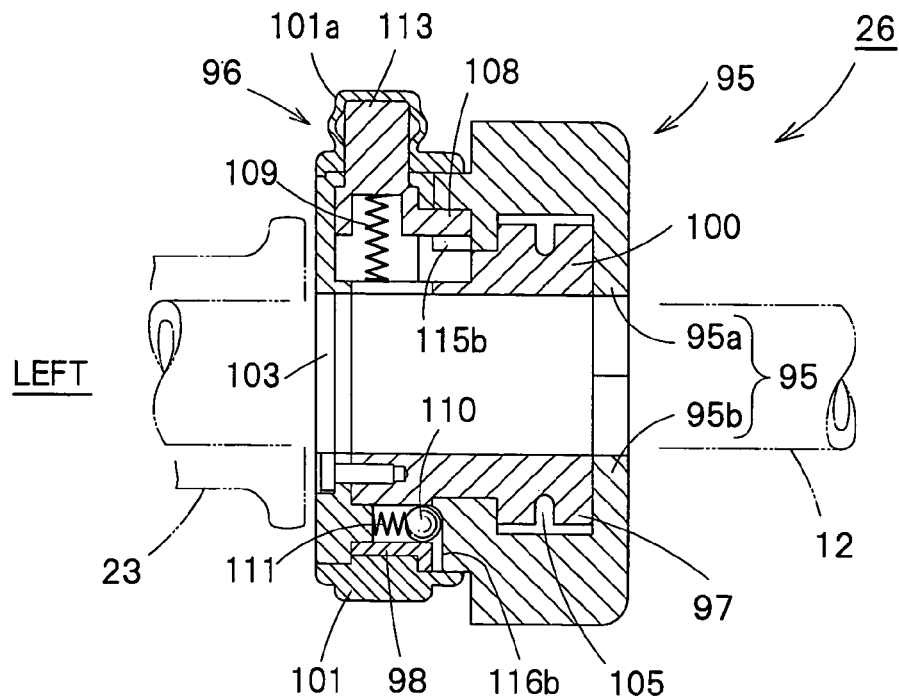
FIG. 11 is a sectional view of XI—XI shown in FIG. 9.

In FIG. 11 which is a longitudinal sectional view of the shift operation device 26 after being assembled, the locking pawl 108 is projected rightward from the dial part 98 and engaged with one of three locking notches 115a, 115b, and 115c (FIG. 13) formed on the left end face of the holder case 95, for example, the neutral position locking notch 115b. The unlocking knob 113 is projected outward from the peripheral surface of the dial part 98 and a knob cover 101a of the rubber cover 101 is fit on the outward projected part. When the unlocking knob 113 is pressed inward in the radial direction against the coil spring 109, the locking pawl 108 is moved inward in the radial direction so as to be unlocked from the locking notch 115b.

The positioning ball 110 is stored in the dial part 98 in an axially movable state, pressed rightward by the coil spring 111, and engaged with one of three positioning slits 116a, 116b, and 116c (FIG. 13) formed on the left end surface of the holder case 95, for example, the neutral positioning slit 116b.

Figure 13:
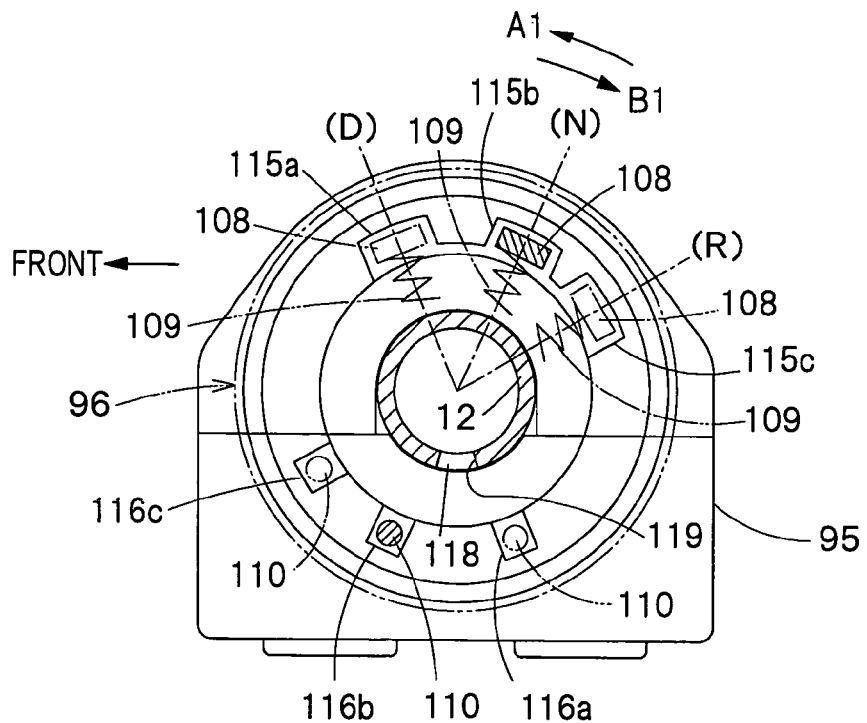
FIG. 13 is a sectional view of XIII—XIII shown in FIG. 8.

FIG. 13 is a sectional view along the line XIII—XIII shown in FIG. 8. An inward-facing projection 118 is formed on the inner peripheral surface of the holder case 95, and the projection 118 is engaged with a positioning hole 119 of the handle bar 12, thereby fixes the holder case 95 so as to disable rotation.

The three locking notches 115a, 115b, and 115c formed on the left end face of the holder case 95 are formed at intervals in the peripheral direction, and the notch 115a positioned on the front side is a forward movement position locking notch, and the notch 115b positioned halfway is a neutral position locking notch, and the notch 115c positioned on the rear side is a backward movement position locking notch. The respective locking notches 115a, 115b, and 115c are open on the axis side, thus the locking pawl 108 can enter or leave from the axis side.

The positioning slits 116a, 116b, and 116c are arranged at a phase difference of almost 180° from the locking notches 115a, 115b, and 115c, and the slit 116c positioned on the front side is a backward movement positioning slit, and the slit 116b positioned halfway is a neutral positioning slit, and the slit 116a positioned on the rear side is a forward movement positioning slit.

Figure 10:
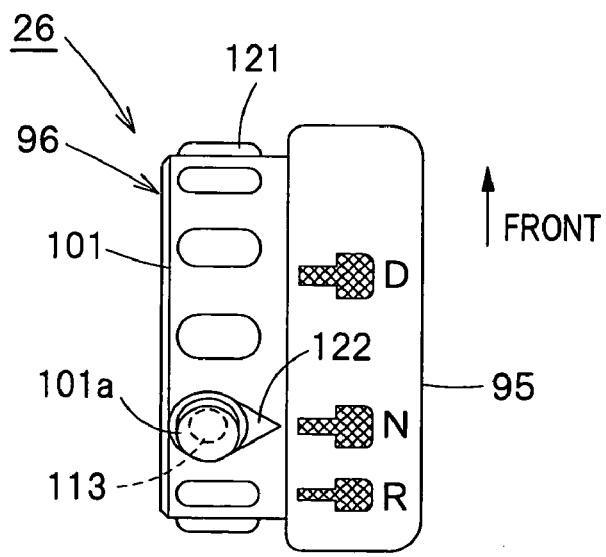
FIG. 10 is a plan view of the shift operation device.

In FIG. 10 showing a plan view, on the cover 101, a plurality of non-slip projections 121 are formed at intervals in the peripheral direction and on the knob cover 101a, a triangular mark 122 is provided. On the other hand, on the surface of the holder case 95, symbols indicating the neutral position N, the forward movement position (drive position) D, and the backward movement position R are indicated and as a mutual relationship between the positions N, D, and R, the forward movement position D is disposed before the neutral position N in the peripheral direction, and the backward movement position R is disposed behind the neutral position N in the peripheral direction.

[Cable Transfer Devices for Transferring the Shift Operation Force]

Figure 14:
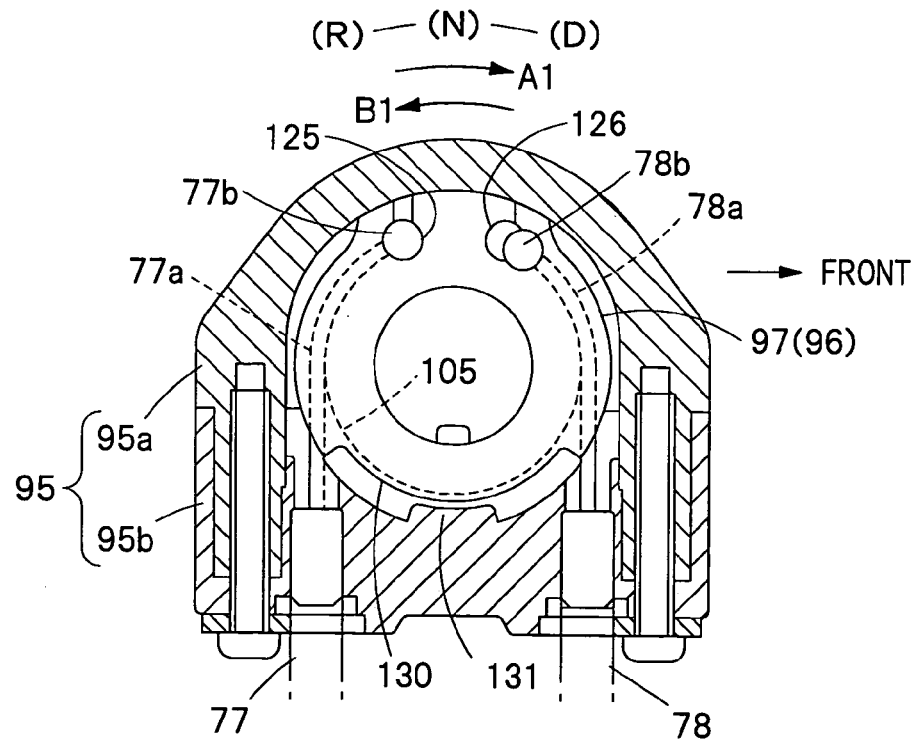
FIG. 14 is a sectional view of XIV—XIV shown in FIG. 8.

FIG. 14 is a sectional view along the line XIV—XIV shown in FIG. 8. The first and second cable transfer devices 77 and 78 are inserted from underneath into the holder case 95, and inner wires 77a and 78a thereof are respectively wound round the reel 97 from the rear side and front side, and end terminals 77b and 78b are joined into joint holes 125 and 126 of the reel 97. When the reel 97 is rotated, as shown in FIG. 14, in the direction of the arrow A1 from the neutral position N, the reel 97 pulls the inner wire 77a of the first cable transfer device 77 and loosens the inner wire 78a of the second cable transfer device 78. On the other hand, when the reel 97 is rotated inversely in the direction of the arrow B1, the reel 97 pulls the inner wire 78a of the second cable transfer device 78 and loosens the inner wire 77a of the first cable transfer device 77.

Further, on the lower side of the reel 97, a notch 130 at a fixed angle is formed, and into the notch 130, an inward-facing projection 131 formed on a lower holder case 95b is projected, thus the maximum rotation range of the reel 97 is controlled.

Both cable transfer devices 77 and 78 reach the neighborhood of the handle shaft 11 along the handle bar 12 shown in FIG. 2, extend downward in the neighborhood of the handle shaft 11, and respectively extend backward along the left and right pipes of the body frame 27, thus as shown in FIG. 6, the inner wires 77a and 78a are connected to both ends of the outer shift lever 73.

[Operation and Function]

[Neutral State]

Figure 9:
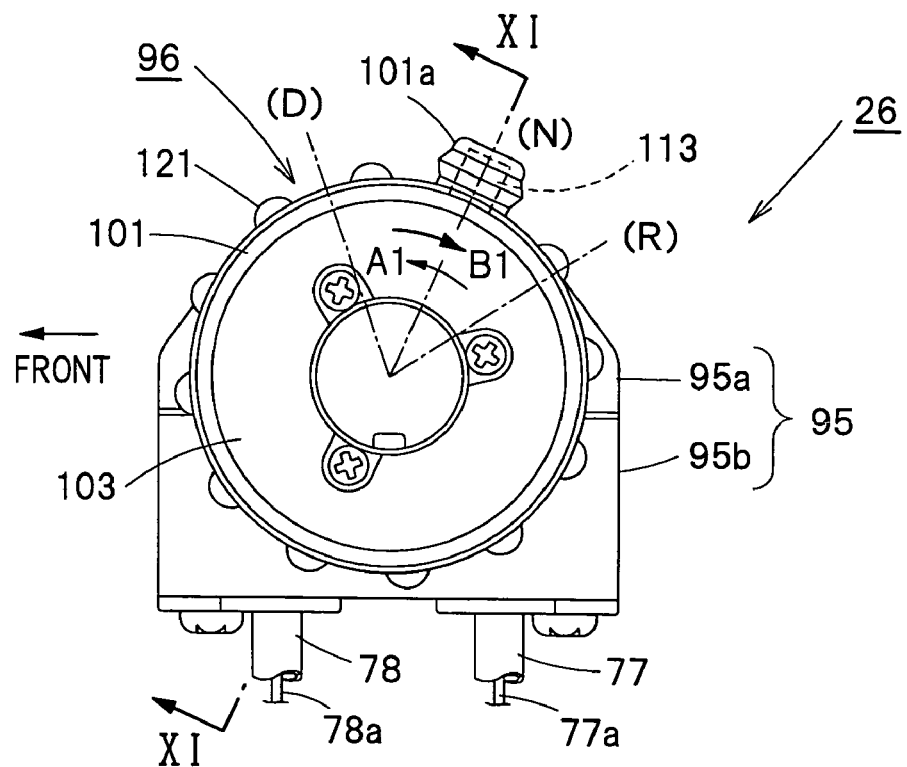
FIG. 9 is a left side view (view of the arrow IX shown in FIG. 8) of the shift operation device.

When the rotor assembly 96 is arranged in the neutral position N as shown in FIGS. 8 to 10, i.e., when the unlocking knob 113 and the mark 122 are fit to the neutral position N, as shown by a solid line in FIG. 13, the locking pawl 108 is joined to the neutral position locking notch 115b, thus the rotor assembly 96 is locked at the neutral position N and can move toward neither the forward movement position D (in the direction of the arrow A1) nor the backward movement position R (in the direction of the arrow B1). Further, the positioning ball 110 is also joined to the neutral positioning slit 116*b* as shown by a solid line in FIG. 13 and the rotor assembly 96 is prevented from play in the rotational direction.

In FIG. 6, the outer shift lever 73 is also arranged in the neutral position N, so that the adjust bolt 83 is opposite to the stopper pin 86 projected with a predetermined gap K, thereby, the outer shift lever 73 is prevented from moving toward the backward movement position R (in the direction of the arrow B2). Namely, moving from the neutral position to the backward movement position is double locked by the stopper mechanism shown in FIG. 6 and the locking mechanism of the shift operation device 26 shown in FIG. 11.

In FIG. 4, the shift sleeve 52 is arranged in the neutral position N and the left and right dog pawls 58 and 59 of the shift sleeve 52 are away from the dog pawls 50*a* and 50*b* of the input gears 50 and 51 for backward movement and forward movement. Therefore, the interval between the input shaft 40 and the input gears 50 and 51 is in a state that the transmitting of power is interrupted.

[Shift from the Neutral Position to the Forward Movement Position]

To shift from the neutral position to the forward movement position, the unlocking knob 113 shown in FIG. 9 is pushed to unlock the locking pawl 108 shown in FIG. 11 and the rotor assembly 96 is rotated toward the forward movement position D in the direction of the arrow A1. Namely, when the unlocking knob 113 shown in FIG. 11 is pushed by finger, the locking pawl 108 is dislocated downward from the neutral position locking notch 115*b*, and the rotor assembly 96 is rotated in the direction of the arrow A1 shown in FIG. 13 with the unlocking state kept, and at the point of time when the positioning ball 110 is joined into the forward movement positioning slit 116*a* on the rear side, the unlocking knob 113 (FIG. 9) is released from the finger. Then, as shown by a hypothetical line in FIG. 13, the locking pawl 108 moving up to the forward movement position locking notch 115*a* is automatically fit into the forward movement position locking notch 115*a* by the coil spring 109. By doing this, the rotor assembly 96 is locked in the forward movement position D so as to prevent from moving in directions of the arrows A1 and AB1. Further, the positioning ball 110 is joined into the forward movement positioning slit 116*a* on the rear side, so that the rotor assembly 96 is prevented from play in the rotational direction.

In FIG. 14, in correspondence with the rotation of the rotor assembly 96 toward the forward movement position D, the inner wire 77*a* of the first cable transfer device 77 is pulled and the inner wire 78*a* of the second cable transfer device 78 is loosened.

In FIG. 6, when the inner wire 77*a* of the first cable transfer device 77 is pulled, the outer shift lever 73 is rotated in the direction of the arrow A2 from the neutral position N to the forward movement position D. Integrally with the rotation of the outer shift lever 73 toward the arrow A2, the shift lever shaft 71 and the inner shift lever 72 shown in FIG. 4 are also rotated, and the shift rod 62 is moved toward the forward movement position D (in the direction of the arrow A3), and the forward movement dog pawl 59 of the shift sleeve 52 mates with the dog pawl 51*a* of the forward movement input gear 51.

In such a forward movement state, the power transferred into the forward and backward movement switching device 6 from the engine 3 shown in FIG. 1 via the V belt non-stage transmission 5 is transferred to the output shaft 43, as shown in FIG. 4, via the input shaft 40, the shift sleeve 52, the dog pawls 59 and 51*a*, the forward movement input gear 51, the forward movement output gear 56, the intermediate output shaft 42, the transfer gear 47, and the output gear 48 and transferred to the rear wheels 2, as shown in FIG. 1, via the power output shaft 17, the drive shaft 19, and the final speed reducer 18 for the rear wheels.

[Shift from the Forward Movement Position to the Neutral Position]

To shift from the forward movement position to the neutral position, the unlocking knob 113 shown in FIG. 9 is pushed to unlock the locking paw 118 and the rotor assembly 96 is rotated in the direction of the arrow B1 from the forward movement position D to the neutral position N.

The basic operation is the same as that of the shift from the neutral position to the forward movement position, so that the explanation will be simplified. In FIG. 13, the locking pawl 108 returning to the neutral position N is automatically fit into the neutral position locking notch 115*b* by the coil spring 109 and locks the rotor assembly 96 in the neutral position N. Further, the positioning ball 110 is joined into the neutral positioning slit 116*b*.

[Shift from the Neutral Position to the Backward Movement Position]

To shift from the neutral position to the backward movement position, both the stopper release operation by the footbrake 10 shown in FIG. 1 and the unlocking operation by the unlocking knob 113 shown in FIG. 11 are necessary. Namely, in FIG. 5, when the footbrake 10 is stepped on, the stopper pin 86 is pulled via the joint projection 91 and stopper mechanism cable device 90 and separated from the moving track of the adjust bolt 83 shown in FIG. 6, thereby, the stopper mechanism is released. In addition to the release operation, when the unlocking knob 113 of the shift operation device 26 shown in FIG. 11 is pushed, the locking pawl 108 is dislocated and unlocked from the neutral position locking notch 115*b*. In the state that the locking mechanism and stopper mechanism are released like this, the rotor assembly 96 is rotated in the direction of the arrow B1 from the neutral position N to the backward movement position R shown in FIG. 13.

When the unlocking knob 113 is released from finger at the point of time when the positioning ball 110 is joined into the backward movement positioning slit 116*c* on the front side, the locking pawl 108 moving up to the backward movement position locking notch 115*c* is automatically fit into the backward movement position locking notch 115*c* by the coil spring 109. By doing this, the rotor assembly 96 is locked in the backward movement position R so as to prevent it from moving in directions of the arrows A1 and AB1. Further, the positioning ball 110 is joined into the backward movement positioning slit 116*c* on the front side, thereby the rotor assembly 96 is prevented from play in the rotational direction.

In FIG. 14, in correspondence with the rotation of the rotor assembly 96 toward the backward movement position D, the inner wire 78*a* of the second cable transfer device 78 is pulled and the inner wire 77*a* of the first cable transfer device 77 is loosened.

In FIG. 6, the stopper pin 86 is pulled in by the stepping operation of the footbrake 10, so that the moving track of the adjust bolt 83 toward the backward movement position D is put into the open state, and the inner wire 78*a* of the second cable transfer device 78 is pulled in this state, thus the outer shift lever 73 is rotated in the direction of the arrow B2 from the neutral position N to the backward movement position R. Integrally with the rotation of the outer shift lever 73 in the direction of the arrow B2, the shift lever shaft 71 and the inner shift lever 72 shown in FIG. 4 are also rotated, and the shift rod 62 is moved in the direction of the arrow B3 toward the backward movement position R, and the backward movement dog pawl 58 of the shift sleeve 52 mates with the dog pawl 50a of the backward movement input gear 50.

When a vehicle is moved backward with the footbrake 10 in FIG. 6 being returned to OFF after shifting to the backward movement position as mentioned above, the stopper pin 86 intends to return to the projection state from the pull-in state by the spring in the pin case 88. However, the end face of the stopper pin 86 makes contact with the side of the adjust bolt 83 in the backward movement position R and the stopper pin 86 is kept in the pull-in state. Further, the strength of the spring set in the pin case 88 is weaker than that of the return spring of the footbrake 10 and even when the stopper pin 86 is stopped in the pull-in state as mentioned above, by the absorption operation due to bending of the cable device 90 and the strength of the footbrake return spring, the footbrake 10 is returned to its normal off state.

In the backward movement state, the power transferred into the forward and backward movement switching device 6 from the engine 3 shown in FIG. 1 via the V belt non-stage transmission 5 is transferred to the output shaft 43, as shown in FIG. 4, via the input shaft 40, the shift sleeve 52, the dog pawls 59 and 50a, the backward movement input gear 50, the backward movement idle gear 54, the backward movement output gear 55, the intermediate output shaft 42, the transfer gear 47, and the output gear 48 and transferred to the rear wheels 2, as shown in FIG. 1, via the power output shaft 17, the drive shaft 19, and the final speed reducer 18 for the rear wheels.

[Shift from the Backward Movement Position to the Neutral Position]

To return to the neutral position from the backward movement position, the stopper release operation by the footbrake 10 shown in FIG. 1 is not necessary and the shift operation can be performed only by the unlocking operation by the unlocking knob 113 shown in FIG. 11. Namely, when the unlocking knob 113 of the shift operation device 26 shown in FIG. 9 is pushed, the locking pawl 108 in the backward movement position R shown in FIG. 13 is dislocated from the backward movement position locking notch 115c toward the axis of the handle bar 12 and in this unlocked state, the rotor assembly 96 is rotated in the direction of the arrow A1 from the backward movement position R to the neutral position N.

In correspondence with the aforementioned shift operation, the outer shift lever 73 shown in FIG. 6 is pulled by the first cable transfer device 77, thereby returned in the direction of the arrow A2 from the backward movement position R to the neutral position N. At this time, the adjust bolt 83 is moved in the direction of the arrow A2 by sliding on the end of the stopper pin 86 in the pull-in state, and at the point of time when the adjust pint 83 is dislocated from the end face of the stopper pin 86, the stopper pin 86 is automatically projected by the spring in the pin case 88 and the mechanism is returned to the stopper operation state.

[Adjustment of the Stopper Mechanism]

In FIG. 4, to prevent the shift sleeve 52 in the neutral position N from making contact with the dog pawls 50a and 51a of the input gears 50 and 51 due to a manufacture error or play in the axial direction, the gap K between the adjust bolt 83 and the stopper pin 86 shown in FIG. 7 is adjusted. Concretely, the gap K is adjusted so as to prevent the dog pawl 58 of the shift sleeve 52 shown in FIG. 4 from making contact with the dog pawl 50a of the backward movement input gear 50 even when the adjust bolt 83 makes contact with the stopper pin 86.

As shown in FIG. 1, the outer shift lever 73 is arranged at the right rear end of the crankcase 4, and the tool joint slit 93 of the adjust bolt 86 shown in FIG. 7 is directed right forward, thus a rider or an operator can simply loosen the locking nut 84 from the side of the vehicle and adjust the rotation of the adjust bolt 86.

In this embodiment, the stopper mechanism is provided on the outer shift lever 73 arranged above the right rear end of the crankcase 4, and the stopper mechanism is interlocked with the footbrake 10 arranged on the right step 9, so that the cables placed from the footbrake 10 to the stopper mechanism may be short, and only external cables may be used, thereby, the mounting operation can be simplified.

In the above-mentioned embodiment, since the stopper mechanism, which is interlocked with the brake device, is provided in order to prevent the switching rotary part of the forward and backward movement switching device from moving to the backward movement position from the neutral position, a brake operation is needed in order to perform a backward shift by the forward and backward movement switching device. Therefore, the shift operation to backward movement can be automatically recognized, and during the shift operation, the vehicle can be prevented from moving back and forth.

In the above-mentioned embodiment, since the locking mechanism of the shift operation device and the stopper mechanism of the forward and backward movement switching device interlocked with the brake device are provided, to perform the shift operation from the neutral position to the backward movement position, the double locking mechanism must be released beforehand, thereby, the recognition of the shift operation to the backward movement can be made surer.

Some modifications can be applied to the above-mentioned embodiment as follows.

(1) The stopper mechanism composed of the stopper pin and adjust bolt may be interlocked with a brake device of a hand lever type.

(2) As the forward and backward movement switching device, a structure that forward movements of two steps, neutral and backward movements can be switched mutually may be used. Furthermore, the arrangement location of the forward and backward movement switching device is not limited to the rear part of the engine unit including the transmission, for example, it may be arranged on the side, front side, or in other places.

(3) As the switching rotary part of the forward and backward movement switching device in which the stopper mechanism interlocked with the brake device is provided, the inner shift lever 72 may be used in stead of the outer shift lever 73 shown in FIG. 5.

(4) Other than the V belt non-stage transmission, for example, a torque converter for an all-terrain vehicle may be used.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A transmission apparatus of an all-terrain vehicle comprising:
    a non-stage transmission disposed in a power transmission path from an engine to drive wheels;
    a forward and backward movement switching device capable of switching to a forward movement position, a neutral position, and a backward movement position, said forward and backward movement switching device being disposed in said power transmission path at a position near said engine;
    a shift operation device for switching forward and backward movements disposed on a handle bar at a position adjacent to a handle grip, said shift operation device and said forward and backward movement switching device being interlocked with each other, said shift operation device being a rotary type and having a rotary member which is rotatable about an axis of the handle bar;
    a locking mechanism mounted on said rotary member to releasably lock said rotary member; and
    a stopper mechanism mounted on said forward and backward switching device to prevent said forward and backward switching device from shifting from said neutral position to said backward movement position, said stopper mechanism being interlocked with a brake of said vehicle so that said stopper mechanism is operated to allow said forward and backward switching device to shift from said neutral position to said backward movement position when a brake operation of the vehicle is performed.

2. A transmission apparatus of an all-terrain vehicle according to claim 1, wherein said rotary member is positioned inward with respect to said handle grip fixed on an end of said handle bar in a manner that said rotary member can be rotated independently of said handle grip, and
    wherein said locking mechanism includes a knob which is mounted on said locking mechanism in a radially movable manner so that said locking mechanism can be unlocked by pushing said knob radially inward.

3. A transmission apparatus of an all-terrain vehicle according to claim 1, wherein said stopper mechanism is configured to prevent a switching rotary part of said forward and backward switching device from shifting from said neutral position to said backward movement position.

4. A transmission apparatus of an all-terrain vehicle according to claim 3 wherein said stopper mechanism has a stopper member capable of entering and leaving a moving track between said neutral position and said backward movement position of said switching rotary part of said forward and backward movement switching device, said stopper member being configured so as to be kept in a state that said stopper member enters said moving track by elastic means and leave said moving track by said brake operation,
    wherein said forward and backward movement switching device includes a case, a shift lever shaft rotatably mounted on said case to perform a shift operation, said switching rotary part being fixed to said shift lever shaft and operatively connected to said shift operation device.

5. A transmission apparatus of an all-terrain vehicle according to claim 4 wherein said forward and backward movement switching device comprises a forward movement input gear, a backward movement input gear, a shift sleeve, and a shift rod operably connected to said shift operation device, said forward movement input gear and said backward movement input gear including dog pawls capable of independently engaging said shift sleeve, said shift rod operably connected to said shift sleeve.

6. A transmission apparatus of an all-terrain vehicle according to claim 4 wherein said stopper mechanism includes an adjustment bolt and a stopper pin.

7. A transmission apparatus of an all-terrain vehicle according to claim 4 wherein said knob includes a locking pawl and said shift operation device includes three locking notches corresponding to said forward movement position, said neutral position, and said backward movement position.

8. A transmission apparatus of an all-terrain vehicle according to claim 1, wherein said brake is a foot brake.

9. A transmission apparatus of an all-terrain vehicle comprising:
    a non-stage transmission disposed in a power transmission path from an engine to driven wheels;
    a forward and backward movement switching device capable of switching to a forward movement position, a neutral position, and a backward movement position, said forward and backward movement switching device being disposed in said power transmission path near said engine;
    a shift operation device located on a steering device of said all-terrain vehicle and operatively connected to said forward and backward movement switching device and capable of switching said forward and backward movement switching device into said forward movement position, said neutral position, and said backward movement position; and
    a stopper mechanism connected to said forward and backward switching device and operatively connected to a brake of said all-terrain vehicle, said stopper mechanism adapted to only allow said forward and backward switching device to switch to said backward movement position when said brake is operated.
    wherein said forward and backward movement switching device includes a switching rotary part and a moving track, said switching rotary part movable in said moving track, said forward and backward movement switching device being switched from said backward movement position, said neutral position, and said forward movement position by movement of said switching rotary part in said moving track, said stopper mechanism including a stopper member capable of entering and leaving said moving track to prevent said switching rotary part from switching said forward and backward movement switching device from switching from said neutral position to said backward movement position, said stopper member being configured so that said stopper member enters said moving track by elastic means and leaves said moving track when said brake is operated, and
    wherein said shift operation device comprises a rotary member rotatively mounted on said steering device, said rotary member operatively connected to said switching rotary part.

10. A transmission apparatus of an all-terrain vehicle as in claim 9 wherein said rotary member is positioned near a hand-gripping area of said steering device, said rotary member capable of being rotated independently of said hand-gripping area.

11. A transmission apparatus of an all-terrain vehicle as in claim 10 further comprising:
    a locking mechanism connected to said rotary member, said locking mechanism capable of preventing said rotary member from rotating, said locking mechanism including a knob, said knob when pressed releasing said locking mechanism so that said rotary member can rotate.

12. A transmission apparatus of an all-terrain vehicle according to claim 11 wherein said forward and backward movement switching device comprises a forward movement input gear, a backward movement input gear, a shift sleeve, and a shift rod operably connected to said shift operation device, said forward movement input gear and said backward movement input gear including dog pawls capable of independently engaging said shift sleeve, said shift rod operably connected to said shift sleeve.

13. A transmission apparatus of an all-terrain vehicle according to claim 11 wherein said stopper mechanism includes an adjustment bolt and a stopper pin.

14. A transmission apparatus of an all-terrain vehicle according to claim 11 wherein said knob includes a locking pawl and said shift operation device includes three locking notches corresponding to said forward movement position, said neutral position, and said backward movement position.

* * * * *